United States Patent
Novak et al.

(10) Patent No.: US 9,525,568 B2
(45) Date of Patent: Dec. 20, 2016

(54) AUTO-TUNING ACTIVE QUEUE MANAGEMENT

(71) Applicant: University of Utah Research Foundation, Salt Lake City, UT (US)

(72) Inventors: Joe Novak, Sandy, UT (US); Sneha K. Kasera, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 14/706,830

(22) Filed: May 7, 2015

(65) Prior Publication Data

US 2015/0326485 A1  Nov. 12, 2015

Related U.S. Application Data

(60) Provisional application No. 61/990,872, filed on May 9, 2014.

(51) Int. Cl.
| | |
|---|---|
| *H04W 52/42* | (2009.01) |
| *H04L 12/64* | (2006.01) |
| *H04L 12/823* | (2013.01) |
| *H04L 12/801* | (2013.01) |
| *H04L 12/841* | (2013.01) |
| *H04L 12/54* | (2013.01) |
| *H04L 12/861* | (2013.01) |

(52) U.S. Cl.
CPC ....... *H04L 12/6418* (2013.01); *H04L 12/5602* (2013.01); *H04L 47/11* (2013.01); *H04L 47/127* (2013.01); *H04L 47/28* (2013.01); *H04L 47/32* (2013.01); *H04L 49/90* (2013.01)

(58) Field of Classification Search
None
See application file for complete search history.

(56) References Cited

PUBLICATIONS

DUK: A Delay-Utilization Curve Based AQM Algorithm.

*Primary Examiner* — Fan Ng
(74) *Attorney, Agent, or Firm* — Workman Nydegger

(57) ABSTRACT

A method for calculating a drop probability can comprise determining, based on measurements within a network architecture of the computer system, a current packet delay and current link utilization within network architecture. The method can also comprise predicting a change in the packet delay within the network architecture at a predefined time interval in the future. Additionally, the method can comprise predicting a change in the link utilization within the network architecture at a predefined time interval in the future. Further, the method can comprise computing a drop probability that will ensure that the ratio of the predicted change in the packet delay over the predicted change in the link utilization approximates an predetermined ideal.

20 Claims, 5 Drawing Sheets

AUTO-TUNING ACTIVE QUEUE MANAGEMENT

CROSS-REFERENCE TO RELATED APPLICATIONS

This application claims priority to and the benefit of U.S. Provisional Application No. 61/990,872, filed on May 9, 2014, entitled "Auto-Tuning Active Queue Management," which is incorporated by reference herein in its entirety.

BACKGROUND

Many network devices, such as routers, maintain one or more packet buffers or queues (e.g., first-in-first out (FIFO)) that buffer packets that are scheduled to go out on the device. These queues accommodate for momentary differences between input and output bandwidth capacities. For example, if a network device has multiple network interfaces, it may have multiple queues—one for each interface—that hold packets that are scheduled to go out on the corresponding interface.

Under heavy network traffic conditions, it is possible for these queues to become filled. When is queue is full, any new packets that are scheduled to go into the queue are typically dropped. This technique is called a drop-tail: a packet is put onto the queue if its usage is less than its maximum size, and the packet is dropped otherwise. Such packet dropping can lead to undesirable network performance, since packets are dropped based on a single factor: buffer availability. Drop-tail tends to unfairly penalize certain types of network traffic, such as bursty flows.

One technique that router manufactures have used to mitigate against drop-tail is to provide queues of larger size in their network devices. Larger queues can prevent packet dropping in a greater variety of network conditions than smaller buffers. However, larger queues have undesirable side effects, including (i) increased latency—since packets must work their way through a larger buffer, and (ii) poor responsiveness of network congestion detection methods. The practice of oversizing queues has been termed tufferbloat, and is considered to be a significant and worsening problem in networking.

Active Queue Management (AQM) techniques have been developed to mitigate against drop-tail and bufferbloat. AQM techniques generally drop certain packets probabilistically, based on a variety of factors, before the buffer is full, so that drop-tail and excessively large queues can be avoided.

For example, one AQM technique is Random Early Detection (RED) and its derivatives. If queue usage grows beyond a lower threshold, RED computes a drop probability proportional to the total queue length. If the queue length grows beyond an upper limit, RED always drops arriving packets. However, RED can be difficult to configure, since the appropriate upper and lower thresholds—which must be manually configured—depend on anticipated traffic conditions.

Another AQM technique, BLUE, is a network load based technique that increases the drop probability if it detects packet loss caused by buffer overflow. BLUE decreases the drop probability when the link becomes idle. However, with BLUE user must manually choose appropriate values for the step sizes for the increase and decrease in drop probability.

Controlled Delay (CoDel) and Proportional Integral Enhanced (PIE) are more recent AQM techniques that focus on queuing delay or sojourn time. CoDel begins to drop packets only after the queuing delay is above a threshold of 100 ms for a duration of a 5 ms threshold. CoDel increases the number of dropped packets as long as the queuing delay is above the 5 ms threshold. Using CoDel, packet drops are not probabilistic. Instead, they are based on time. CoDel exponentially decreases the time between packet drops until the queuing delay is reduced below the 5 ms threshold. PIE is a linear feedback control system with thresholds of queuing delay and maximum queue length. Its parameters include deviation from a target queue delay and a balance between queuing delay deviation and jitter.

While these, and other, AQM techniques have had some moderate success at mitigating against drop-tail and bufferbloat, existing AQM techniques all depend upon the specification of thresholds or wide-scale pre-tuning of parameters for different conditions. As such, AQM techniques can be difficult for the average administrator to properly deploy, and do not perform well in networks that have changing traffic conditions.

BRIEF SUMMARY OF THE INVENTION

Implementations of the present invention comprise systems, methods, and apparatus configured to provide computer-implemented search-based AQM techniques that are fully adaptive to current and anticipated network conditions. As such, the embodiments herein provide AQM techniques that do not depend on specification of any parameters or thresholds up-front, and that thus do not require any pre-tuning. Embodiments include actively measuring dynamic parameters within a computer network environment, and using these parameters to calculate probabilities for admitting and dropping network packets in a manner that balances queuing delay and link bandwidth utilization. Thus, admit/drop probabilities are dynamically determined, and not pre-specified as in conventional AQM techniques.

At least one implementation of the present invention can comprise a method for calculating a drop probability. The method can include determining, based on measurements within a network architecture of the computer system, a current packet delay and current link utilization within network architecture. The method can also comprise predicting a change in the packet delay within the network architecture at a predefined time interval in the future. Additionally, the method can comprise predicting a change in the link utilization within the network architecture at a predefined time interval in the future. Further, the method can comprise computing a drop probability that will ensure that the ratio of the predicted change in the packet delay over the predicted change in the link utilization approximates an predetermined ideal.

Additionally, at least one embodiment of the present invention can comprise a computer system. The computer system can include one or more processors, system memory, and one or more computer-readable media storing computer-executable instructions that, when executed by the one or more processors, cause the computer system to implement a method for calculating a drop probability for dropping packets to a network buffer based on network link utilization. The method can comprise determining, from a networking environment of the computer system, a current differential change in packet delay through a network buffer. The method can also comprise determining, from the networking environment, a current differential change in network link utilization. Additionally, the method can comprise calculating a ratio of the differential change in packet delay over the differential change in network link utilization.

Further, the method can comprise when the ratio is greater than the particular threshold, increasing the drop probability so that a lesser proportion of network packets are admitted to the network buffer over the particular time period.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments are directed to computer-implemented search-based AQM techniques that are fully adaptive to current and anticipated network conditions. As such, the embodiments herein provide AQM techniques that do not depend on specification of any parameters or thresholds up-front, and that thus do not require any pre-tuning. Embodiments include actively measuring dynamic parameters within a computer network environment, and using these parameters to calculate probabilities for admitting and dropping network packets in a manner that balances queuing delay and link bandwidth utilization. Thus, admit/drop probabilities are dynamically determined, and not pre-specified as in conventional AQM techniques.

Embodiments of the present invention provide significant improvements in both performance within network environments and in ease of deployment. For example, embodiments of the present invention dynamically self-adjust such that deployment can be achieved without the significant expertise required by conventional queue management systems. Additionally, implementations of the present invention can provide a highly efficient balance between network utilization and queuing delay.

Figure 1:
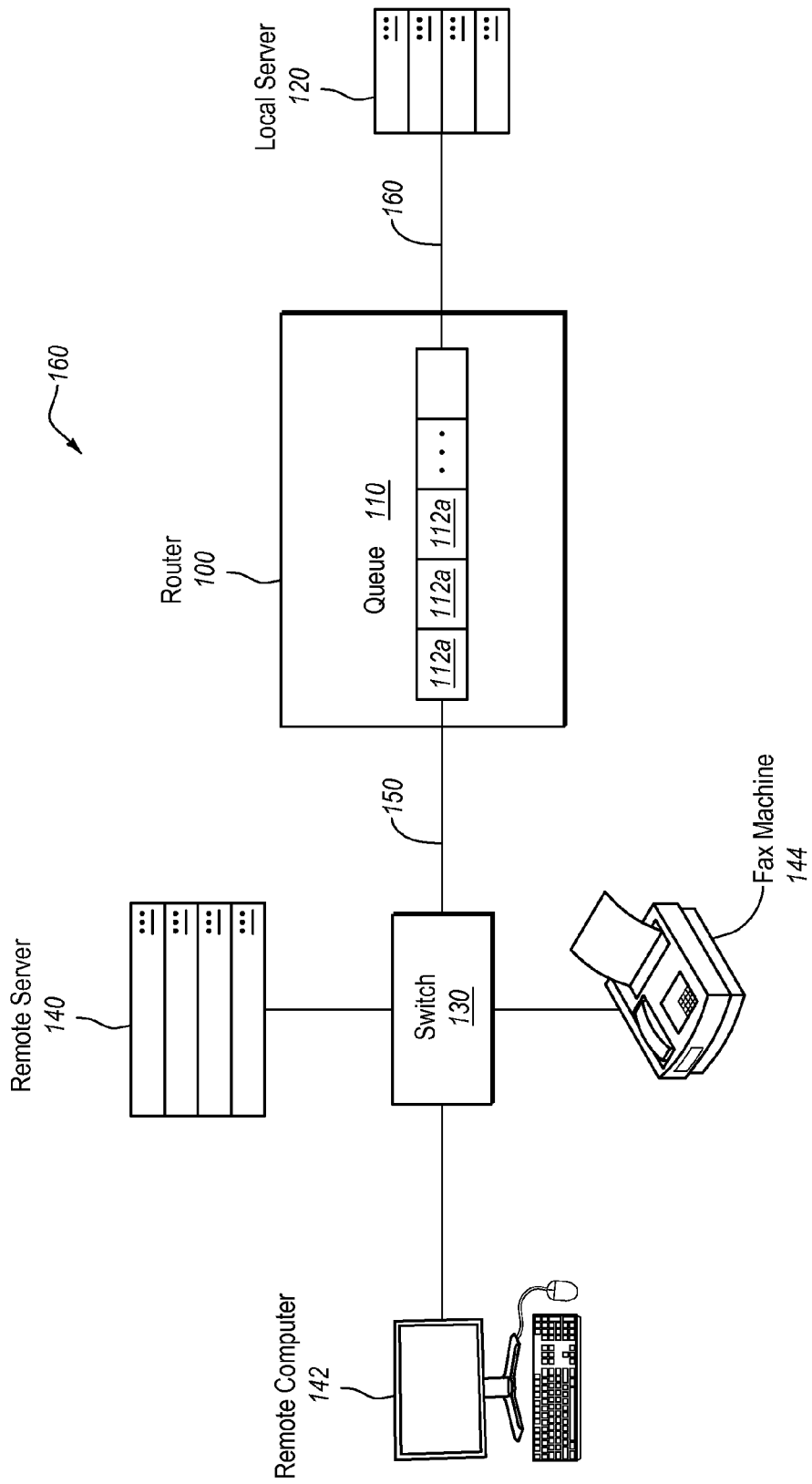
FIG. 1 illustrates a schematic diagram of a network system in accordance with implementations of the present invention.

For example, FIG. 1 depicts a schematic of a network system 160 in accordance with embodiments of the present invention. In particular, the network system 160 comprises a remote server 140, a remote computer 142, and a fax machine 144 all in communication with a switch 130. The switch 130 is in communication with a router 100 through a 1 Gbps connection 150. The router 100 is in communication with a local server 120 through a 100 Mbps connection 160. Additionally, the router 100 comprises a network queue 110, which comprises various memory spaces 112(a-c) for queuing data packets.

One will understand that the network system 160 depicted in FIG. 1 is merely exemplary. Embodiments of the present invention can function within networks that comprises different configurations and components. Additionally, one will understand that the components depicted by FIG. 1 are symbolic and may not literally reflect the components as used within real-world networks.

In at least one embodiment, the remote server 140, remote computer 142, and fax machine 144 may each be sending data packets through switch 130 to local server 120, which is behind router 100. Additionally, in at least one embodiment, the 1 Gbps connection 150 can transmit significantly more data than 100 Mbps connection 160. As such, in some cases, the router 100 may receive data faster than it can transmit the data to the local server 120 through the 100 Mbps connection 160.

When receiving more data than it can transmit, the router 100 can utilize a queue 110 to store at least a portion of the received data, until that data can be transmitted on to the local server 120. The queue 110 can comprise memory spaces 112(a-c) that store data packets. In at least one embodiment, the received data packets progress through the queue 100 from an initial memory space 112a to a subsequent memory space 112b until the data packet is transmitted to the local server 120.

While a queue 100 can aid in situations where a network's ingress is exceeding its transmission capabilities, one will understand that a queue is not a perfect solution. For example, queues are limited by their memory space, and oftentimes do not have the capacity to store all excess data packets. Additionally, larger queues also increase network latency.

Accordingly, embodiments of the present invention provide unique systems and methods for dynamically managing network queues. For example, implementations of the present invention provide methods and systems for dynamically determining a drop probability. Additionally, as will be explained in greater detail below, implementations of the present invention can manage queues as a function of utilization of bandwidth.

Figure 2:
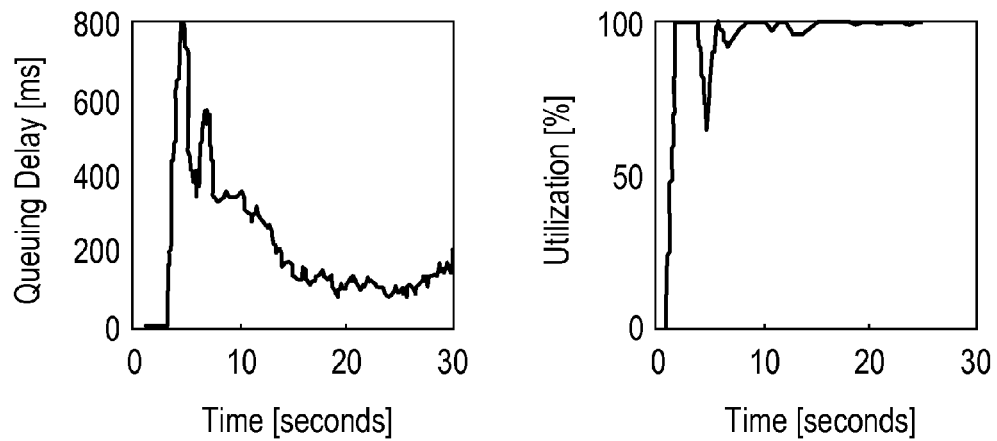
FIG. 2 illustrates complimentary graphs relating to network communications in accordance with implementations of the present invention.
Figure 3:
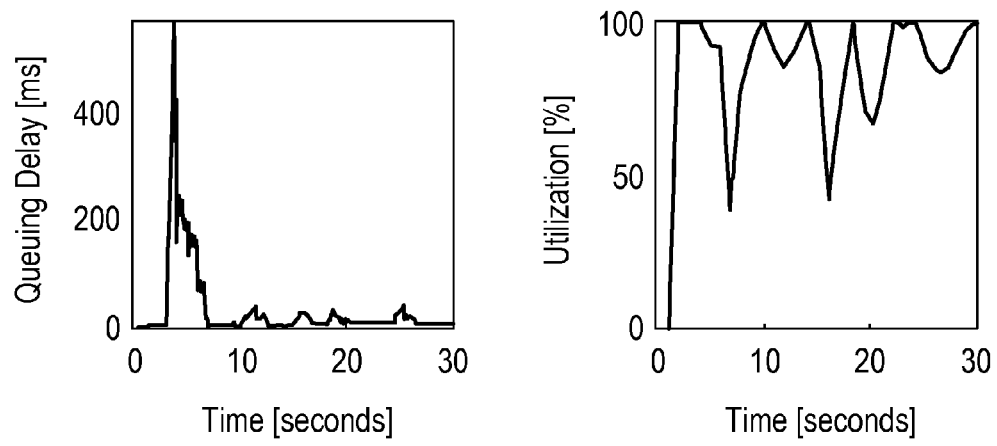
FIG. 3 illustrates other complimentary graphs relating to network communications in accordance with implementations of the present invention.

One or more embodiments of the present invention can calculate a drop probability, which indicates the amount of traffic that should be admitted or dropped over a time period. Embodiments disclosed herein can also calculate a step size, which is the amount that the drop probability changes from one iteration to the next. Additionally, in at least one implementation, a drop probability can be calculated that balances queuing delay and link bandwidth utilization. FIGS. 2 and 3 illustrate a potential relationship between delay and utilization with different step sizes. For example, FIG. 2 depicts queuing delay and utilization when the step size is set too low. As shown in FIG. 2, with a low step size link bandwidth utilization is high, but the queuing delay is not controlled. In contrast, FIG. 3 depicts the relationship between delay and utilization when the step size is set too high. As shown in FIG. 3, with a high step size the queuing delay is low, but link bandwidth utilization suffers.

Conventional AQM techniques view queues as a function of time, and use a pre-tuned step-size or base step-size on queue length. By contrast, the AQM techniques described herein calculate a step size dynamically by viewing queues as a function of utilization—using first and second order derivatives of delay with respect to utilization. In particular, embodiments of the AQM techniques described herein are based on ensuring that a change of delay (D) at a network device queue does not exceed the increase in utilization (U) of the link. In other words, in embodiments of the present invention the ratio of the derivative of the delay divided by the derivative of the utilization (i.e., dD/dU) should not be greater than one.

Embodiments of the AQM techniques described herein attempt to keep link utilization at a naturally occurring operating point on the knee position (hyperbola vertex) of a delay-utilization curve, by predicting the operating point on the curve a short time in the future. Then, a drop probability is set to maintain the knee position of the curve. As such, the embodiments herein can quickly adapt to any bandwidth or offered load without reducing link utilization or increasing queuing delay.

Figure 4:
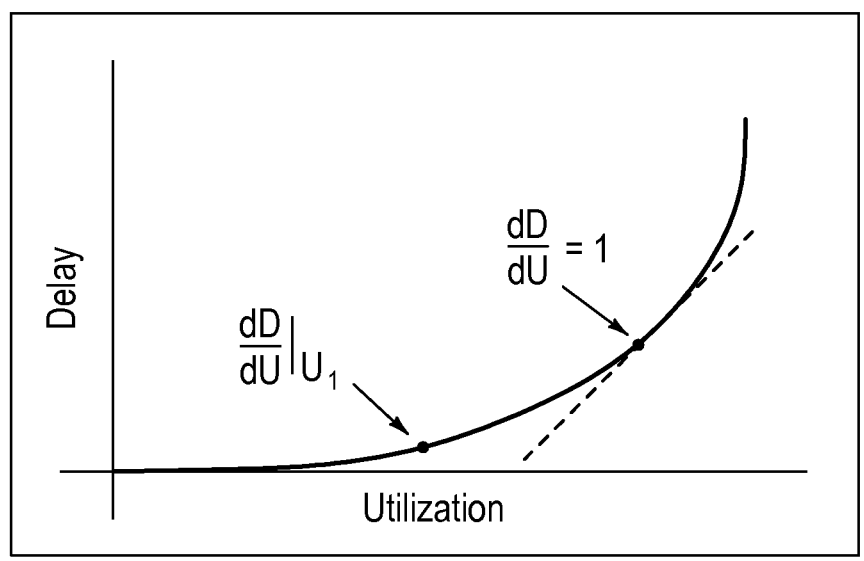
FIG. 4 illustrates a network delay versus network utilization graph in accordance with implementations of the present invention.

For example, FIG. 4 illustrates an example delay-utilization curve, with a knee position at $$\frac{dD}{dU} = 1.$$

At this point, a differential change in the utilization incurs an equal change in the delay, and the first derivative of the delay with respect to the utilization is equal to one. Beyond the knee position an increase in delay without an equivalent increase in utilization is detrimental to the performance of network applications, without any real benefit to the network providers.

According to one embodiment, if the queuing system operates to the left of the knee position at a particular point in time, more packets are admitted to the queue to increase link utilization without any significant increase in delay. By contrast, if the queuing system operates to the right of the knee position, more packets are dropped to disproportionately reduce delay in comparison to the reduction in utilization. In either case, the admission or dropping of packets is dynamically adjusted to bring system operation back to the knee position.

To the accomplishment of the foregoing, the AQM techniques herein include periodically calculating a time interval and a drop probability, and dropping packets for the calculated time interval in accordance with the calculated drop probability. The drop probability is computed based on predictions of where the system will be operating on the delay-utilization curve a short time in the future. If a packet is not dropped, it is appended to the end of the queue.

Following is example pseudo-code for a single iteration of calculation of a drop probability and a time interval:

```
// section 1: initialize and check idle
A = packet arrival rate
C = estimate of link capacity
M = estimate of maximum packet arrival rate
d = current d(delay) / d(utilization)
k = queue length in packets
t = time interval
u = change in utilization
if (k == 0 or A == 0)
{
pdrop = 0
return
}
// section 2: compute based on hyperbola vertex
pdrop = 1 - ((1 - d) * u * C + C * t) / (A * t)
if (pdrop < 0)
    pdrop = 0
else if (pdrop > 1)
    pdrop = 1
// section 3: adjust time interval
t = max(-0.5 * (100 * (M - C) / M) + 65, 20)
```

Section 1 first initializes variables. As indicated, in some embodiments the variables include a packet arrival rate (A), an estimate of link capacity (C), an estimate of maximum arrival rate (M), a current ratio of the change in delay and the change in utilization $$\left(\frac{dD}{dU}\right)$$

or (a), a queue length in packets (k), a time interval (t), and a change in utilization (ΔU) or (u).

It is noted that any appropriate measure of time (t) can be used, but in some embodiments the measurement is in milliseconds. It is also noted that there are two time intervals at play: the time between iterations of the foregoing pseudo-code, and the amount of time in the future at which the operating point on the delay-utilization curve is predicted. For simplicity, in some embodiments the same value (t) is used for both of these time intervals. One of ordinary skill in the art will recognize, however, that differing time intervals may also be used.

It is also noted that in the foregoing implementation, apart from the time interval (t), each variable is measured from current operating conditions, and is thus not based on any predefined or pre-tuned parameters or thresholds. However, (t) is still dependent on operating conditions—on the first iteration the time interval (t) is initially set to a default value (e.g., 65 ms), and is then it is dynamically adjusted during subsequent iterations based on operating conditions.

After initializing variables, section 1 detects idle link conditions. In particular, section 1 sets the drop probability (pdrop) to zero any time the queue becomes empty or when no data is being received. In at least one embodiment, pdrop determines the probability with which received packets are dropped. If a packet is not dropped, it is appended to the tail of the queue.

In the provided example, section 2 computes pdrop using the equation (1−((1−d)*u*C+C*t)/(A*t)), which is one example only of how a drop probability may be calculated. This equation may return a value outside of the range [0, 1] when abrupt changes in the delay-utilization curve occur. Section 2 checks for this condition and ensures the drop probability is within valid limits. An explanation of how the pdrop equation may be derived follows.

In the present example, the pdrop calculation is based on an estimate of a point on the delay-utilization curve at which the system is initially operating. In FIG. 3, this point is labeled as $$\left.\frac{dD}{dU}\right|_{U_i},$$

where $U_i$ is the utilization at that point. The calculation of $$\left.\frac{dD}{dU}\right|_{U_i}$$

is based on measurements taken at runtime. A point $$\left.\frac{dD}{dU}\right|_{U_f}$$

is the point on the delay-utilization curve that the queuing system reaches after some packets are admitted or dropped, and utilization at this point is $U_f$. In order to determine the packet drop probability, a simplifying assumption is made that the second derivative of the delay-utilization curve is constant over a short time. Under this assumption, $$\left.\frac{dD}{dU}\right|_{U_f} = \left.\frac{dD}{dU}\right|_{U_4} + \frac{d^2 D}{dU^2}(U_f - U_4) \quad (1)$$

An equation for $d^2D/dU_2(U_f-U_t)$ can be derived as follows. Given a goal to reach $dD/dU=1$ on the delay-utilization curve, we arrive at:

$$1 = \left.\frac{dD}{dU}\right|_{U_i} + \frac{d^2 D}{dU^2}(U_f - U_i) \quad (2)$$

The change in delay $\Delta D$ over the prediction time $\Delta t$ is computed as the difference between the admit rate $\alpha$ and the capacity C times $\Delta t$ all divided by the capacity, as shown in Equation 3. In equation 3, the arrival rate A and the capacity C are assumed to remain constant over a short time $\Delta t$.

$$\Delta D = \frac{\alpha - C}{C} \Delta t \quad (3)$$

The admit rate is equal to the probability of admitting or keeping a packet $p_k$ multiplied by the arrival rate:

$$\alpha = p_k A \quad (4)$$

We combine equations 3 and 4 to find the change in delay from the current time to the prediction time in terms of the keep probability. This gives Equation 5:

$$\Delta D = \frac{p_k A - C}{C} \Delta t \quad (5)$$

By the chain rule, $$\frac{d^2 D}{dU^2} = \frac{d}{dt}\left(\frac{dD}{dU}\right)\frac{dt}{dU} \quad (6)$$

The change in utilization over a short time is the final value of the utilization minus the initial value, $dU=U_f-U_i$. Equations 5 and 6 can be combined to obtain Equation 8 as follows:

$$\frac{d^2 D}{dU^2} = \left[\frac{d}{dt}\left(\frac{\frac{p_k A - C}{C}}{U_f - U_i} dt\right)\right]\frac{\Delta t}{U_f - U_i} \quad (7)$$

$$\frac{d^2 D}{dU^2}(U_f - U_i) = \left(\frac{\frac{p_k A - C}{C}}{U_f - U_i}\right)\Delta t \quad (8)$$

Equations 2 and 8 are combined to solve for the keep probability $p_k$:

$$p_k = \frac{\left(1 - \left.\frac{dD}{dU}\right|_{U_i}\right)(U_f - U_i)C}{A\Delta t} + \frac{C}{A} \quad (9)$$

We obtain the drop probability $p=1-p_k$ from Equation 10:

$$p = 1 - \left[\frac{\left(1 - \left.\frac{dD}{dU}\right|_{U_i}\right)(U_f - U_i)C}{A\Delta t} + \frac{C}{A}\right] \quad (10)$$

The provided equation $(1-((1-d)*u*C+C*t)/(A*t))$ for pdrop used above is then derived from Equation 10.

After computing the drop probability, and ensuring that it is within limits, section 3 updates the time interval, as alluded to previously. In the provided example, section 3 computes t using the equation max(-0.5*(100*(M-C)/M)+65, 20), which is one example only of how a time interval may be calculated. According to this equation, when higher congestion occurs, the queueing system responds more quickly to control delay, and at lower congestion the queueing system responds more slowly to absorb bursts.

In some embodiments, the foregoing equation for computing the time interval (t) is based on experimental observation of throughput using different time intervals over a range of congestion conditions. In some environments, for example, with about 10% congestion, a time interval of about 60 ms yields maximum throughput, and a higher time interval increases delay with little to no increase in throughput. In these environments, at about 90% congestion a time interval of about 20 ms yields maximum throughput. Other data points between these extremes are approximately linear.

In some embodiments, the time interval depends on the potential congestion, which may be higher than the instantaneous arrival rate may dictate. As such, a congestion computation may rely on the ingress link capacity. The ingress link capacity may be based on the physical link rate, or can be approximated with the highest observed arrival rate. Approximating the ingress link capacity based on the highest observed arrival rate can ensure that the time interval is computed based on run-time measurements (and thus current environment).

Based on these observations, the time interval (t) may be expressed as equation max(-0.5*(100*(M-C)/M)+65, 20), where M is a runtime estimate of the ingress link capacity and C is a runtime estimate of the egress link capacity. In some embodiments, the initial time interval of 65 ms is used, with the assumption that there is no congestion at system startup. In some embodiments, the time interval is limited to a minimum of 20 ms, since the accuracy of measurements is observed to degrade below 20 ms.

Alternatively, in at least one embodiment the time interval (t) may be calculated as $t=2*(W_1*RTT_1+W_{i+1}*RTT_{i+1}+W_{i+2}*RTT_{1+}+ \ldots )$. As indicated by the equation, the time interval (t) can be set to 2 times the summation of the weighted average of the round trip times (RTTs) of each flow (i). Additionally, the equation can use weighting factor $W_i$ that is equal to the normalized traffic volume of the flow during the previous interval. In at least one embodiment, the equation can be multiplied by 2 because it takes one RTT to set the interval and one to observe the effects of the new value.

As used within the equation i indicates the flow number, such that $W_t$ is the weight of flow i. In at least one embodiment, $W_t$ can be calculated as the traffic from flow i divided by the total traffic over the previous interval. In various embodiments, RTT can be determined through a different means. For example, RTT can be determined by modifying TCP end points to send the information. In an alternate implementation, RTT can be determined through the use of a passive RTT estimate.

Accordingly, embodiments of the present invention provide significant improvements in both performance within network environments and in ease of deployment. For example, embodiments of the present invention dynamically self-adjust such that deployment can be achieved without the significant expertise required by conventional queue management systems. Additionally, implementations of the present invention can provide a highly efficient balance between network utilization and queuing delay.

Accordingly, FIGS. 1-4 and the corresponding text illustrate or otherwise describe one or more methods, systems, and/or instructions stored on a storage medium for calculating a drop probability for dropping packets to a network buffer based on network link utilization. One will appreciate that implementations of the present invention can also be described in terms of methods comprising one or more acts for accomplishing a particular result. For example, FIGS. 5 and 6 and the corresponding text illustrate flowcharts of a sequence of acts in a method for calculating a drop probability for dropping packets to a network buffer based on network link utilization. The acts of FIGS. 5 and 6 are described below with reference to the components and modules illustrated in FIGS. 1-4 and the accompanying specification.

Figure 5:
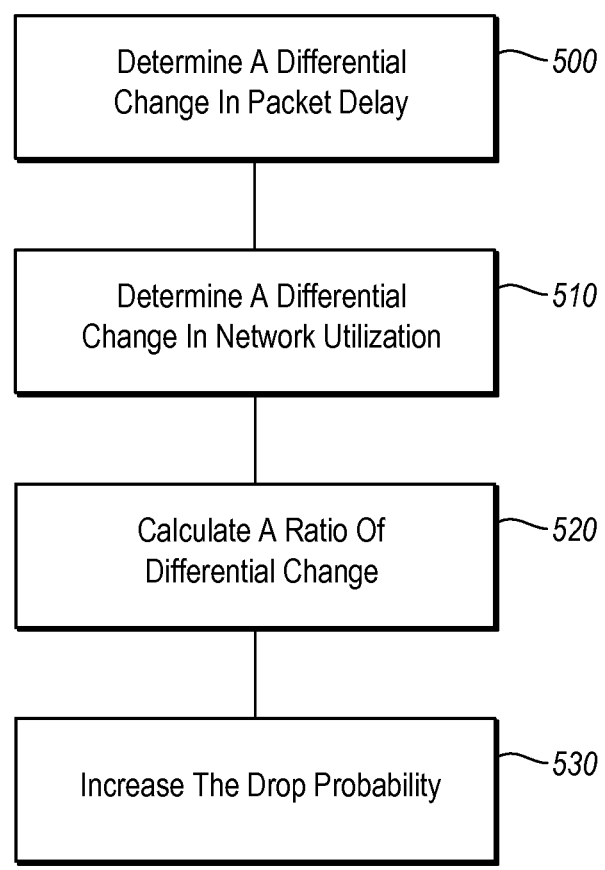
FIG. 5 illustrates depicts a flowchart of steps within a method in accordance with embodiments of the present invention.
Figure 6:
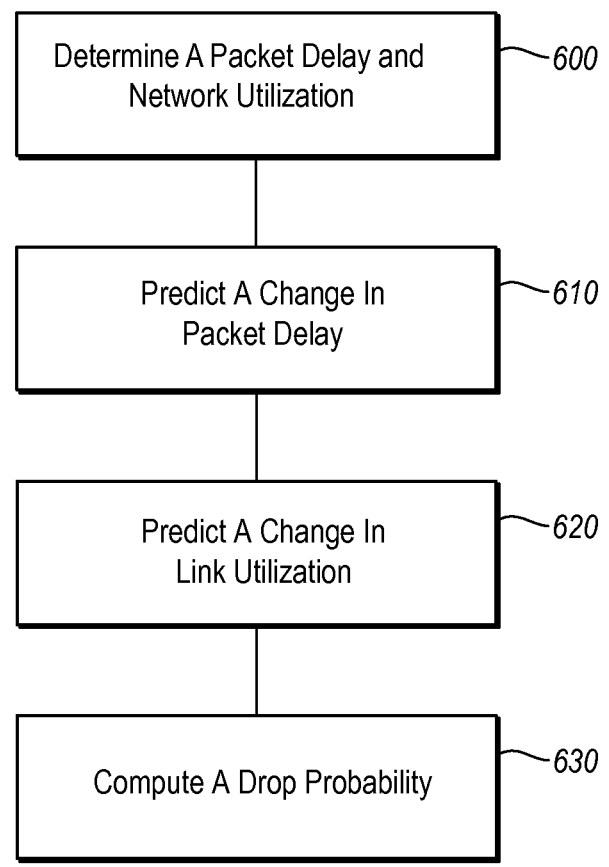
FIG. 6 illustrates depicts another flowchart of steps within another method in accordance with embodiments of the present invention.

For example, FIG. 5 illustrates that a flow chart for an implementation of a method calculating a drop probability for dropping packets to a network buffer based on network link utilization can comprise an act 500 of determining a differential change in packet delay. Act 500 includes determining, from a networking environment of the computer system, a current differential change in packet delay through a network buffer. For example, in various embodiments, the current network delay or latency can be measured by the local network device. Additionally, once one or more delay measurements are taken, the change in packet delay can be calculated. Additionally, in at least one implementation, the current differential change in packet delay can be directly received from the network device.

FIG. 5 also shows that the method can comprise an act 510 of determining a differential change in network utilization. Act 510 includes determining, from the networking environment, a current differential change in network link utilization. For example, in various embodiments, the current network utilization can be measured by the local network device. Additionally, once one or more utilization measurements are taken, the change in network utilization can be calculated. Additionally, in at least one implementation, the current differential change in network utilization can be directly received from the network device.

Additionally, FIG. 5 shows that the method can comprise an act 520 of calculating a ratio of differential change. Act 520 can include calculating a ratio of the differential change in packet delay over the differential change in network link utilization. For example, once the changes in packet delay and network utilization are determined, a ratio of the two can be calculated.

Further, FIG. 5 shows that the method can comprise an act 530 of increasing the drop probability. Act 530 can include increasing the drop probability, when the ratio is greater than the particular threshold, so that a lesser proportion of network packets are admitted to the network buffer over the particular time period. For example, equation 10 and the accompanying description teach a method for increasing the drop probability based upon the ratio of the change in packet delay and the change in network utilization. In particular, equation 10 is used to derive $(1-((1-d)*u*C+C*t)/(A*t))$, which can be used to determine the drop probability.

As an example of an additional implementation, FIG. 6 illustrates that a flow chart for an implementation of a method for calculating a drop probability and a network utilization can comprise an act 600 of determining a packet delay. Act 600 includes determining, based on measurements within a network architecture of the computer system, a current packet delay and current link utilization within network architecture. For example, the router 100 as depicted in FIG. 1, may comprise internal measurement functions that can provide both the packet delay and the link utilization.

FIG. 6 also shows that the method can comprise an act 610 of predicting a change in the packet delay. Act 610 includes predicting a change in the packet delay within the network architecture at a predefined time interval in the future. For example, equations 5-8 and the accompanying descriptions disclosed above teach a method for predicting a change in the packet delay at some point in the future.

Additionally, FIG. 6 shows that the method can comprise an act 620 of predicting a change in link utilization. Act 620 can include predicting a change in the link utilization within the network architecture at a predefined time interval in the future. For example, equation 10 and $(1-((1-d)*u*C+C*t)/(A*t))$ along with the accompany description disclose that the action of predicting a change in link utilization can be accomplished as an integrated portion of determining the drop probability. For example, $dU=U_f-U_i$ is a component within equation 10.

Further, FIG. 6 shows that the method can comprise an act 630 of computing a drop probability. Act 630 can include computing a drop probability that will ensure that the ratio of the predicted change in the packet delay over the predicted change in the link utilization approximates a predetermined ideal. For example, the above disclosed equation, $(1-((1-d)*u*C+C*t)/(A*t))$, can be used to determine a drop probability.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system, comprising:
   one or more processors;
   system memory; and
   one or more computer-readable media storing computer-executable instructions that, when executed by the one or more processors, cause the computer system to implement a method for calculating a drop probability for dropping packets to a network buffer based on network link utilization, the method comprising:
   determining, from a networking environment of the computer system, a current differential change in packet delay through a network buffer;
   determining, from the networking environment, a current differential change in network link utilization;
   calculating a ratio of the differential change in packet delay over the differential change in network link utilization;
   when the ratio is greater than a threshold, increasing the drop probability so that a lesser proportion of network packets are admitted to the network buffer over the particular time period.

2. The system of claim 1, wherein the threshold is one.

3. The system of claim 1, further comprising:
   predicting a value of the ratio at a point in the future; and
   adjusting the drop probability based upon the predicted ratio.

4. The system of claim 1, further comprising calculating a iteration time interval, wherein the iteration time interval determines that amount of time between iterations of drop probability calculations.

5. The system of claim 1, further comprising calculating a future-looking time interval, wherein the future-looking time interval determines that amount of time in the future at which an operating point on a delay-utilization curve is predicted.

6. The system of claim 1, further comprising when the ratio is less than a particular threshold, decreasing the drop probability so that a greater proportion of network packets are admitted to the network buffer over a particular time period.

7. The system of claim 1, further comprising:
   estimating, from a networking environment of the computer system, a current ingress link capacity of the networking environment;
   estimating, from the networking environment, a current egress link capacity of the networking environment;
   calculating an estimated current congestion factor of the networking environment, including calculating a ratio of the difference between the ingress link capacity and the egress link capacity, over the ingress link capacity; and
   determining a time interval based on the maximum of the estimated current congestion factor and a minimum time interval, wherein the time interval determines that amount of time between iterations of drop probability calculations.

8. The system of claim 1, wherein calculating the estimated current congestion factor of the networking environment, includes adding an initial time interval.

9. The system of claim 1, further comprising:
   identifying round trip times for one or more flows;
   identify a weight factor for each flow, wherein the weight factor comprises a weight equal to the normalized traffic volume of each flow during a previous interval;
   determining a time interval based upon summing together the product of each round trip time for each flow and each respective weight factor for each flow and multiplying the total sum by a constant.

10. At a computer system that includes one or more processors and system memory, a method for calculating a drop probability, the method comprising:
    determining, based on measurements within a network architecture of the computer system, a current packet delay and current link utilization within network architecture;
    predicting a change in the packet delay within the network architecture at a predefined time interval in the future;
    predicting a change in the link utilization within the network architecture at a predefined time interval in the future; and
    computing a drop probability that will ensure that the ratio of the predicted change in the packet delay over the predicted change in the link utilization approximates an predetermined ideal.

11. The method of claim 10, wherein predicting the change in the packet delay and the change in the link utilization comprises computing a second derivative of the current packet delay with respect to the current link utilization.

12. The method of claim 10, wherein the predetermined ideal is one.

13. The method of claim 10, further comprising calculating a iteration time interval, wherein the iteration time interval determines that amount of time between iterations of drop probability calculations.

14. The method of claim 13, further comprising calculating a future-looking time interval, wherein the future-looking time interval determines that amount of time in the future at which an operating point on a delay-utilization curve is predicted.

15. The method of claim 14, wherein the future-looking time interval and the iteration time interval are equal to each other.

16. The method of claim 10, further comprising when the ratio is less than a particular threshold, calculating a lower drop probability so that a greater proportion of network packets are admitted to a network buffer over a particular time period.

17. The method of claim 10, further comprising when the ratio is greater than a particular threshold, calculating a greater drop probability so that a lesser proportion of network packets are admitted to a network buffer over a particular time period.

18. The method of claim 10, further comprising:
    identifying round trip times for one or more flows;
    identify a weight factor for each flow, wherein the weight factor comprises a weight equal to the normalized traffic volume of each flow during a previous interval;
    determining a time interval based upon summing together the product of each round trip time for each flow and each respective weight factor for each flow and multiplying the total sum by a constant, wherein the time interval determines that amount of time in the future at which an operating point on a delay-utilization curve is predicted.

19. A non-transitory computer program product comprising one or more computer storage media having stored thereon computer-executable instructions that, when executed at a processor, cause the computer system to perform a method for calculating a drop probability for dropping packets to a network buffer based on network link utilization, the method comprising:

determining, from a networking environment of the computer system, a current differential change in packet delay through a network buffer;

determining, from the networking environment, a current differential change in network link utilization;

calculating a ratio of the differential change in packet delay over the differential change in network link utilization;

when the ratio is greater than the particular threshold, increasing the drop probability so that a lesser proportion of network packets are admitted to the network buffer over the particular time period.

20. The non-transitory computer program on claim 19, further comprising when the ratio is less than a particular threshold, decreasing the drop probability so that a greater proportion of network packets are admitted to the network buffer over a particular time period.

\* \* \* \* \*